United States Patent
Finnerty et al.

(10) Patent No.: US 9,591,482 B1
(45) Date of Patent: Mar. 7, 2017

(54) METHOD FOR AUTHENTICATING DRIVER FOR REGISTRATION OF IN-VEHICLE TELEMATICS UNIT

(71) Applicant: Sprint Communications Company L.P., Overland Park, KS (US)

(72) Inventors: Brian J. Finnerty, Stilwell, KS (US); Jeffrey L. Uden, Olathe, KS (US); Shane R. Werner, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 12 days.

(21) Appl. No.: 14/530,667

(22) Filed: Oct. 31, 2014

(51) Int. Cl.
*H04W 12/06* (2009.01)
*G07C 5/00* (2006.01)
*H04L 29/06* (2006.01)

(52) U.S. Cl.
CPC ............ *H04W 12/06* (2013.01); *G07C 5/008* (2013.01); *H04L 69/28* (2013.01)

(58) Field of Classification Search
CPC ......... H04W 12/06; G07C 5/008; H04L 69/28
See application file for complete search history.

(56) References Cited

U.S. PATENT DOCUMENTS

| | | | |
|---|---|---|---|
| 5,892,900 | A | 4/1999 | Ginter et al. |
| 6,622,083 | B1 | 9/2003 | Knockeart et al. |
| 7,209,964 | B2 | 4/2007 | Dugan et al. |
| 7,366,892 | B2 | 4/2008 | Spaur et al. |
| 7,376,392 | B2 | 5/2008 | Myojo |
| 7,454,473 | B2 | 11/2008 | Suzuki |
| 7,912,224 | B2 | 3/2011 | Lee et al. |
| 7,949,375 | B2 | 5/2011 | Kortge |

(Continued)

FOREIGN PATENT DOCUMENTS

| | | |
|---|---|---|
| DE | 102011112546 A1 | 4/2014 |
| JP | 20062441 A | 9/2006 |

(Continued)

OTHER PUBLICATIONS

Foreign Communication From a Related Counterpart Application, International Preliminary Report on Patentability dated Nov. 13, 2014, PCT/US13/39514 filed on May 3, 2013.

(Continued)

*Primary Examiner* — Lester Kincaid
*Assistant Examiner* — William Wang (57) ABSTRACT

A method of registering a telematics unit for telematics services is disclosed. The method comprises a mobile communication device of a subscriber contacting a mobile network operator (MNO) to register a telematics unit (TU) of a vehicle for telematics services, wherein the mobile communication device provides a vehicle identification number (VIN) of the vehicle that the TU is associated with. The MNO looks up a phone number of the TU based on the VIN. A mobile communication network sends an electronic message to remove incoming voice call blocking of the phone number. The MNO then places a voice call to the unpublished phone number of the TU. The MNO then validates the subscriber. The MNO then engages in a voice dialog with the subscriber associated with the vehicle via the TU. The mobile communication network then sends an electronic message to reestablish voice call blocking of the TU.

20 Claims, 4 Drawing Sheets

(56) References Cited

U.S. PATENT DOCUMENTS

| | | | |
|---|---|---|---|
| 7,966,111 | B2 | 6/2011 | Moinzadeh et al. |
| 8,271,050 | B2 | 9/2012 | Weiss |
| 8,417,823 | B2 | 4/2013 | Luna et al. |
| 8,457,686 | B2 | 6/2013 | Przybylski |
| 8,484,707 | B1 | 7/2013 | Bertz et al. |
| 8,527,164 | B2 | 9/2013 | Staudinger et al. |
| 8,548,532 | B1 | 10/2013 | Ng |
| 8,606,335 | B2 | 12/2013 | Ozaki |
| 8,626,152 | B2 | 1/2014 | Farrell et al. |
| 8,630,747 | B2 | 1/2014 | Burcham et al. |
| 8,676,199 | B2 | 3/2014 | Madhavan et al. |
| 8,750,942 | B1 | 6/2014 | Ng |
| 8,787,949 | B2 | 7/2014 | Sumcad et al. |
| 8,918,244 | B2 | 12/2014 | Brzezinski et al. |
| 8,994,591 | B2 | 3/2015 | Dupray et al. |
| 9,002,574 | B2 | 4/2015 | Garrett et al. |
| 9,031,498 | B1 | 5/2015 | Bertz et al. |
| 9,032,547 | B1 | 5/2015 | Hohler et al. |
| 9,110,774 | B1 | 8/2015 | Bonn et al. |
| 9,173,238 | B1 | 10/2015 | Bloomcamp et al. |
| 9,252,951 | B1 | 2/2016 | Katzer et al. |
| 9,398,454 | B1 | 7/2016 | Burcham et al. |
| 9,439,240 | B1 | 9/2016 | Shipley et al. |
| 9,444,892 | B1 | 9/2016 | Amireddy et al. |
| 2001/0042107 | A1 | 11/2001 | Palm |
| 2003/0066884 | A1 | 4/2003 | Reddy et al. |
| 2003/0096641 | A1 | 5/2003 | Odinak |
| 2003/0120601 | A1 | 6/2003 | Ouye et al. |
| 2003/0224840 | A1 | 12/2003 | Frank et al. |
| 2004/0044585 | A1* | 3/2004 | Franco .................. G06Q 30/016 705/304 |
| 2004/0083041 | A1 | 4/2004 | Skeen et al. |
| 2004/0125957 | A1 | 7/2004 | Rauber et al. |
| 2004/0157650 | A1 | 8/2004 | Wissinger et al. |
| 2005/0021744 | A1 | 1/2005 | Haitsuka et al. |
| 2005/0065779 | A1 | 3/2005 | Odinak |
| 2005/0113102 | A1 | 5/2005 | Kwon et al. |
| 2006/0059480 | A1 | 3/2006 | Kimoto |
| 2006/0087971 | A1 | 4/2006 | Kim et al. |
| 2006/0143463 | A1 | 6/2006 | Ikeda et al. |
| 2006/0154659 | A1 | 7/2006 | Roter et al. |
| 2006/0168578 | A1 | 7/2006 | Vorlicek |
| 2007/0028220 | A1 | 2/2007 | Miller et al. |
| 2007/0047466 | A1 | 3/2007 | Todokoro |
| 2007/0086579 | A1 | 4/2007 | Lorello et al. |
| 2007/0113269 | A1 | 5/2007 | Zhang |
| 2007/0124043 | A1 | 5/2007 | Ayoub et al. |
| 2007/0124045 | A1 | 5/2007 | Ayoub et al. |
| 2007/0124046 | A1 | 5/2007 | Ayoub et al. |
| 2007/0160199 | A1 | 7/2007 | Sekiguchi et al. |
| 2007/0288423 | A1 | 12/2007 | Kimoto |
| 2008/0021633 | A1 | 1/2008 | Naito et al. |
| 2008/0034126 | A1 | 2/2008 | Baker |
| 2008/0072047 | A1 | 3/2008 | Sarikaya et al. |
| 2008/0148374 | A1 | 6/2008 | Spaur et al. |
| 2008/0162676 | A1 | 7/2008 | Magnusson |
| 2008/0289018 | A1 | 11/2008 | Kawaguchi |
| 2008/0289044 | A1 | 11/2008 | Choi |
| 2008/0307086 | A1 | 12/2008 | Brooks et al. |
| 2009/0028082 | A1 | 1/2009 | Wynn et al. |
| 2009/0049119 | A1 | 2/2009 | Marcinkiewicz et al. |
| 2009/0109941 | A1 | 4/2009 | Carter |
| 2009/0217036 | A1 | 8/2009 | Irwin et al. |
| 2009/0265278 | A1 | 10/2009 | Wang et al. |
| 2009/0287499 | A1 | 11/2009 | Link, II |
| 2010/0054219 | A1 | 3/2010 | Humblet et al. |
| 2010/0097239 | A1 | 4/2010 | Campbell et al. |
| 2010/0136944 | A1 | 6/2010 | Taylor et al. |
| 2010/0197362 | A1 | 8/2010 | Saitoh et al. |
| 2010/0220250 | A1 | 9/2010 | Vanderwall et al. |
| 2010/0234071 | A1 | 9/2010 | Shabtay et al. |
| 2010/0235285 | A1 | 9/2010 | Hoffberg |
| 2010/0245122 | A1* | 9/2010 | Haralson .................. G06F 8/60 340/870.16 |
| 2010/0260350 | A1 | 10/2010 | Chutorash et al. |
| 2010/0285787 | A1 | 11/2010 | Matsuda |
| 2011/0009107 | A1 | 1/2011 | Guba et al. |
| 2011/0086668 | A1 | 4/2011 | Patel |
| 2011/0090908 | A1 | 4/2011 | Jacobson et al. |
| 2011/0098044 | A1 | 4/2011 | Aoyagi |
| 2011/0099316 | A1 | 4/2011 | Tseng et al. |
| 2011/0111728 | A1* | 5/2011 | Ferguson .......... H04M 1/72541 455/404.2 |
| 2011/0252415 | A1 | 10/2011 | Ricci |
| 2011/0257973 | A1 | 10/2011 | Chutorash et al. |
| 2011/0263293 | A1 | 10/2011 | Blake et al. |
| 2011/0295444 | A1 | 12/2011 | Westra et al. |
| 2011/0310731 | A1 | 12/2011 | Park et al. |
| 2012/0028597 | A1* | 2/2012 | Chmielewski ........ B60R 25/102 455/404.1 |
| 2012/0028607 | A1 | 2/2012 | Tengler et al. |
| 2012/0028656 | A1* | 2/2012 | Yi ........................ H04W 4/046 455/458 |
| 2012/0109406 | A1 | 5/2012 | Yousefi et al. |
| 2012/0127139 | A1 | 5/2012 | Hayami et al. |
| 2012/0134497 | A1 | 5/2012 | Roitshtein et al. |
| 2012/0142367 | A1* | 6/2012 | Przybylski ............ H04W 4/046 455/456.1 |
| 2012/0159638 | A1 | 6/2012 | McDade, Sr. |
| 2012/0167071 | A1 | 6/2012 | Paek |
| 2012/0183221 | A1 | 7/2012 | Alasry et al. |
| 2012/0203557 | A1 | 8/2012 | Odinak |
| 2012/0282895 | A1 | 11/2012 | Bai et al. |
| 2012/0324046 | A1 | 12/2012 | Park |
| 2013/0082820 | A1 | 4/2013 | Tieman |
| 2013/0205026 | A1 | 8/2013 | Ricci |
| 2013/0218400 | A1 | 8/2013 | Knoop et al. |
| 2013/0226391 | A1 | 8/2013 | Nordbruch et al. |
| 2013/0297456 | A1 | 11/2013 | Annan et al. |
| 2013/0304281 | A1 | 11/2013 | Burcham et al. |
| 2014/0053261 | A1 | 2/2014 | Gupta et al. |
| 2014/0068010 | A1 | 3/2014 | Nicholson et al. |
| 2014/0087760 | A1 | 3/2014 | Bennett |
| 2014/0128047 | A1* | 5/2014 | Edwards ................ H04L 51/12 455/415 |
| 2014/0130036 | A1 | 5/2014 | Gurikar et al. |
| 2014/0143354 | A1* | 5/2014 | Tiernan .................. H04L 51/32 709/206 |
| 2014/0222298 | A1 | 8/2014 | Gurin |
| 2014/0222910 | A1 | 8/2014 | Petersen et al. |
| 2014/0336919 | A1 | 11/2014 | Li et al. |
| 2015/0288636 | A1 | 10/2015 | Yalavarty et al. |

FOREIGN PATENT DOCUMENTS

| | | |
|---|---|---|
| WO | WO2013166418 A2 | 11/2013 |
| WO | WO2013173331 A1 | 11/2013 |

OTHER PUBLICATIONS

Foreign Communication From a Related Counterpart Application, International Preliminary Report on Patentability dated Nov. 27, 2014, PCT/US13/40940 filed on May 14, 2013.

Notice of Allowance dated Dec. 3, 2014, U.S. Appl. No. 13/094,494, filed Apr. 26, 2011.

First Action Interview Pre-Communication dated Dec. 1, 2014, U.S. Appl. No. 13/844,226, filed Mar. 15, 2013.

Notice of Allowance dated Jan. 6, 2015, U.S. Appl. No. 13/661,536, filed Oct. 26, 2012.

Supplemental Notice of Allowance dated Jan. 30, 2015, U.S. Appl. No. 13/661,536, filed Oct. 26, 2012.

Restriction Requirement dated Mar. 19, 2015, U.S. Appl. No. 13/463,799, filed May 3, 2012.

Final Office Action dated Mar. 17, 2015, U.S. Appl. No. 13/769,268, filed Feb. 15, 2013.

Notice of Allowance dated Mar. 12, 2015, U.S. Appl. No. 13/844,226, filed Mar. 15, 2013.

Amireddy, Sridhar Reddy, et al., Patent Application entitled, "Vehicle Remote Operations Control," filed Apr. 28, 2015, U.S. Appl. No. 14/698,522.

(56) References Cited

OTHER PUBLICATIONS

Notice of Allowance dated Jun. 12, 2015, U.S. Appl. No. 13/769,268, filed Feb. 15, 2013.
First Action Interview Pre-Communication dated Jul. 9, 2015, U.S. Appl. No. 14/034,475, filed Sep. 23, 2013.
Restriction Requirement dated Feb. 24, 2015, U.S. Appl. No. 14/304,861, filed Jun. 13, 2014.
Office Action dated Jun. 30, 2015, U.S. Appl. No. 14/304,861, filed Jun. 13, 2014.
Restriction Requirement dated Sep. 4, 2015, U.S. Appl. No. 13/455,121, filed Apr. 24, 2012.
Katzer, Robin D., "Vehicle Key Function Control From a Mobile Phone Based on Radio Frequency Link From Phone to Vehicle," filed Jun. 13, 2014, U.S. Appl. No. 14/304,861.
Office Action dated Sep. 9, 2015, U.S. Appl. No. 13/463,799, filed May 3, 2012.
Notice of Allowance dated Sep. 18, 2015, U.S. Appl. No. 14/304,861, filed Jun. 13, 2014.
Belkin, Wireless Network Access Point User Manual, published by Belkin Corporation, 2003, pp. 1-36.
Office Action dated Jan. 13, 2016, U.S. Appl. No. 13/218,503, filed Aug. 26, 2011.
Final Office Action dated Mar. 10, 2016, U.S. Appl. No. 13/463,799, filed May 3, 2012.
First Action Interview Pre-Communication dated Jan. 29, 2016, U.S. Appl. No. 13/455,121, filed Apr. 24, 2012.
Notice of Allowance dated Mar. 11, 2016, U.S. Appl. No. 13/455,121, filed Apr. 24, 2012.
Final Office Action dated Mar. 8, 2016, U.S. Appl. No. 14/034,475, filed Sep. 23, 2013.
Restriction Requirement dated Jan. 29, 2016, U.S. Appl. No. 14/703,997, filed May 5, 2015.
Amireddy, Sridhar Reddy, et al., Patent Application entitled, "Network Event Management Support for Vehicle Wireless Communication," filed May 5, 2015, U.S. Appl. No. 14/703,997.
Amireddy, Sridhar Reddy, et al., Patent Application entitled, "Vehicle Telematics Unit Communication Authorization and Authentication and Communication Service Provisioning," filed Aug. 8, 2015, U.S. Appl. No. 14/819,425.
Aboda, B., et al., "Exentsible Authentication Protocol (EAP)", Network Working Group, RFC 3748, Standards Track, Jun. 2004.
Foreign Communication From a Related Counterpart Application, International Search Report and Written Opinion dated Jun. 13, 2013, International Application No. PCT/US13/40940 filed on May 14, 2013.
Foreign Communication From a Related Counterpart Application, International Search Report and Written Opinion dated Dec. 23, 2013, International Application No. PCT/US13/39514 filed on May 3, 2013.
First Action Interview Office Action dated Jan. 3, 2013, U.S. Appl. No. 13/218,503, filed Aug. 26, 2011.
Final Office Action dated May 7, 2013, U.S. Appl. No. 13/218,503, filed Aug. 26, 2011.
Advisory Action dated Aug. 1, 2013, U.S. Appl. No. 13/218,503, filed Aug. 26, 2011.
Office Action dated Feb. 5, 2014, U.S. Appl. No. 13/218,503, filed Aug. 26, 2011.
Final Office Action dated Jun. 16, 2014, U.S. Appl. No. 13/218,503, filed Aug. 26, 2011.
Advisory Action dated Sep. 26, 2014, U.S. Appl. No. 13/218,503, filed Aug. 26, 2011.
Office Action-Restriction Requirement dated May 7, 2014, U.S. Appl. No. 13/094,494, filed Apr. 26, 2011.
Office Action dated Aug. 28, 2014, U.S. Appl. No. 13/094,494, filed Apr. 26, 2011.
First Action Interview Pre-Interview Communication dated Oct. 26, 2012, U.S. Appl. No. 13/156,438, filed Jun. 9, 2011.
Notice of Allowance dated Feb. 26, 2013, U.S. Appl. No. 13/156,438, filed Jun. 9, 2011.
First Action Interview Pre-Communication dated Jan. 31, 2012, U.S. Appl. No. 13/246,554, filed Sep. 27, 2011.
FAIPP Office Action dated May 21, 2012, U.S. Appl. No. 13/246,554, filed Sep. 27, 2011.
Final Office Action dated Sep. 5, 2012, U.S. Appl. No. 13/246,554, filed Sep. 27, 2011.
Advisory Action dated Nov. 2, 2012, U.S. Appl. No. 13/246,554, filed Sep. 27, 2011.
Office Action dated Dec. 5, 2012, U.S. Appl. No. 13/246,554, filed Sep. 27, 2011.
Notice of Allowance dated May 20, 2013, U.S. Appl. No. 13/246,554, filed Sep. 27, 2011.
First Action Interview Pre-Communication dated Nov. 15, 2013, U.S. Appl. No. 13/791,658, filed Aug. 20, 2013.
Notice of Allowance dated Jan. 30, 2014, U.S. Appl. No. 13/791,658, filed Aug. 20, 2013.
Office Action dated Mar. 13, 2013, U.S. Appl. No. 13/471,107, filed May 14, 2012.
Notice of Allowance dated Aug. 26, 2013, U.S. Appl. No. 13/471,107, filed May 14, 2012.
Office Action dated Aug. 12, 2014, U.S. Appl. No. 13/769,268, filed Feb. 15, 2013.
Office Action dated Jul. 14, 2014, U.S. Appl. No. 13/661,536, filed Oct. 26, 2012.
Shipley, Trevor D., et al. Patent Application entitled "Mobile Communication System Identity Pairing," filed Aug. 26, 2011, U.S. Appl. No. 13/218,503.
Bertz, Lyle T., et al. Patent Application entitled "Automotive Multi-Generation Connectivity," filed Apr. 26, 2011, U.S. Appl. No. 13/094,494.
Burcham, Robert H., et al. Patent Application entitled "In-car Head unit Wireless Communication Service Subscription Initialization," filed Apr. 24, 2012, U.S. Appl. No. 13/455,121.
Bloomcamp, Eric Michael, et al. Patent Application entitled "Dual Path In-Vehicle Communication," filed Feb. 15, 2013, U.S. Appl. No. 13/769,268.
Bonn, Michael J., et al. Patent Application entitled "System and Method of Utilizing Driving Profiles via a Mobile Device," filed Mar. 15, 2012, U.S. Appl. No. 13/844,226.
Hohler, Rick A., et al., Patent Application entitled "Provisioning Vehicle based Digital Rights Management for Media Delivered via Phone," filed Oct. 26, 2012, U.S. Appl. No. 13/662,536.
Bloomcamp, Eric M., et al., Patent Application entitled "Authenticating Mobile Device for on Board Diagnostic System Access," filed Sep. 23, 2013, U.S. Appl. No. 14/034,475.
Notice of Allowance dated Apr. 28, 2016, U.S. Appl. No. 13/218,503, filed Aug. 26, 2011.
Advisory Action dated May 20, 2016, U.S. Appl. No. 13/463,799, filed May 3, 2012.
Advisory Action dated Jun. 1, 2016, U.S. Appl. No. 14/034,475, filed Sep. 23, 2013.
Notice of Allowance dated May 16, 2016, U.S. Appl. No. 14/703,997, filed May 5, 2015.
Service Platform for the Connected Traveler, Sep. 9, 2008, Seventh Fromwork Programme, vol. 1, 28, 43, 71, 87.
Office Action dated Sep. 26, 2016, U.S. Appl. No. 13/463,799, filed on May 3, 2012.
Office Action dated Oct. 4, 2016, U.S. Appl. No. 14/034,475, filed on Sep. 23, 2013.
First Action Interview Pre-Communication dated Sep. 9, 2016, U.S. Appl. No. 14/698,522, filed on Apr. 28, 2015.

* cited by examiner

METHOD FOR AUTHENTICATING DRIVER FOR REGISTRATION OF IN-VEHICLE TELEMATICS UNIT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Companies may want potential subscribers to subscribe to their services as simply as possible. Telematics units may provide in-vehicle telematics services. Telematics units are computers within vehicles that receive sensor information from sensor computers associated with the vehicle. Telematics units may need to be registered for telematics services to activate telematics services.

SUMMARY

In an embodiment, a method of registering a vehicle telematics unit for telematics services is disclosed. The method comprises contacting a mobile network operator to register a telematics unit of a vehicle for telematics services by a mobile communication device of a subscriber. The method further comprises providing a vehicle identification number (VIN) of the vehicle that the telematics unit is associated with by the mobile communication device. The method further comprises looking up an unpublished phone number of the telematics unit based on the VIN of the vehicle by the mobile network operator from a computer. The method further comprises sending an electronic message via a data communication link to the telematics unit to remove incoming voice call blocking of the phone number of the telematics unit by a mobile communication network from a computer, wherein voice call blocking prevents incoming voice calls from being completed to the telematics unit. The method further comprises placing a voice call to the unpublished phone number of the telematics unit by the mobile network operator. The method further comprises validating the subscriber by the mobile network operator, wherein validation is implied by a powered-on state of the telematics unit. The method further comprises engaging in a voice dialog with the subscriber associated with the vehicle by the mobile network operator via the telematics unit, wherein the subscriber registers for telematics services. The method further comprises after completing the voice dialog with the subscriber that registers for the telematics services, sending an electronic message via a data communication link to the telematics unit to reestablish voice call blocking of the telematics unit of the vehicle by the mobile communication network.

In an embodiment, a method of registering a vehicle telematics unit for telematics services is disclosed. The method comprises contacting a mobile network operator to register a telematics unit of a vehicle for telematics services by an email message from a subscriber, wherein the email message provides a vehicle identification number (VIN) for the vehicle that is associated with the telematics unit, wherein the email is sent from a computer. The method further comprises looking up an unpublished phone number of the telematics unit based on the VIN of the vehicle by the mobile network operator from a computer. The method further comprises sending an electronic message to the telematics unit via a data communication link to remove incoming voice call blocking of the vehicle telematics unit by the mobile communication network, wherein voice call blocking prevents incoming voice calls from being completed to the telematics unit. The method further comprises placing a voice call to the unpublished phone number of the telematics unit by the mobile network operator. The method further comprises validating the subscriber by the mobile network operator, wherein validation is implied by a powered-on state of the vehicle telematics unit. The method further comprises engaging in a dialog with the subscriber associated with the vehicle by the mobile network operator via the telematics unit, wherein the subscriber registers for telematics services. The method further comprises after completing the voice dialog with the subscriber that registers for the telematics services, sending an electronic message via a data communication link to the telematics unit to reestablish voice call blocking of the telematics unit of the vehicle by the mobile communication network.

In an embodiment, a method of registering a vehicle telematics unit for telematics services is disclosed. The method comprises contacting a mobile network operator to register a telematics unit for mobile communication services by a mobile communication device of a subscriber. The method further comprises providing a vehicle identification number (VIN) of a vehicle associated with the telematics unit of the subscriber by the mobile communication device. The method further comprises looking up an unpublished phone number of the telematics unit based on the VIN of the vehicle by the mobile network operator from a workstation computer. The method further comprises sending an electronic message to the telematics unit via a data communication link to remove incoming voice call blocking of the phone number of the telematics unit by a mobile communication network, wherein voice call blocking prevents incoming voice calls from being completed to the telematics unit, wherein the telematics unit controls voice call blocking of the vehicle. The method further comprises placing a voice call to the unpublished phone number of the telematics unit by the mobile network operator. The method further comprises validating the subscriber by the mobile network operator, wherein validation is implied with a powered-on state of the telematics unit. The method further comprises engaging in a voice dialog with the subscriber associated with the vehicle by the mobile network operator, wherein the subscriber registers the telematics unit for telematics services. The method further comprises after completing the voice dialog with the subscriber, sending an electronic message to the vehicle telematics unit to reestablish voice call blocking of the telematics unit by the mobile network operator.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a plurality of methods that promote registering a vehicle telematics unit for telematics services. Telecommunications service providers may provide in-vehicle telematics services that they want subscribers to register for. Telematics services may comprise one or more of remote vehicle lock/unlock, and/or start service; wireless voice communication service; wireless data communication service; remote diagnostic service; remote maintenance service; and other services supported by wireless communication links. These telematics services may be available for use in the vehicle after user registration. A common scenario may be that a new car buyer may be offered an initial period of free telematics services, and the registration may be completed by the user at the car dealer's venue or shortly after purchase of the vehicle, for example at home parked in the driveway. In the past, registration for such telematics services may have been tedious for subscribers and may have resulted in frustration for the subscriber or in the subscriber not registering for telematics services at all. Telecommunications service providers may wish to improve the rate at which subscribers register for in-vehicle telematics services, for example to expand their subscriber base or to increase their revenues. The method of registration disclosed herein may allow for simplified registration of an in-vehicle telematics unit for telematics services that are provided by a telecommunication service provider.

In an embodiment, a subscriber contacts a mobile network operator to register a telematics unit of a vehicle for telematics services using a mobile communication device. The services for which the telematics unit and/or the subscriber is registering, comprises one or more of remote door unlock and global positioning services. In an embodiment, the mobile network operator is associated with a telecommunication service provider. The subscriber provides the mobile network operator a vehicle identification number (VIN) of the vehicle that the telematics unit is associated with. The mobile network operator then searches for an unpublished phone number of the telematics unit based on the VIN of the vehicle. In an embodiment, the unpublished phone number is located in an unpublished phone number data store. The mobile network operator then sends an electronic message to a mobile communication network to remove incoming voice call blocking of the phone number of the telematics unit via the mobile communication network. Voice call blocking prevents incoming voice calls from being completed to the telematics unit. In an embodiment, voice call blocking functionality may be located in the mobile communication network that is accessed by the mobile network operator (e.g., the network detects an attempt to originate a voice call to the telematics unit and prevents that origination attempt from propagating to the telematics unit).

Alternatively, voice call blocking may instead be provided by the telematics unit (e.g., the voice call origination attempt propagates to the telematics unit, but the telematics unit itself then blocks further call processing of the voice call origination attempt, the driver experiences no ringing of an incoming call and the call is not completed). In this alternative, the mobile network operator may send an electronic message to the subject telematics unit to remove incoming voice call blocking by the telematics unit (temporarily suspend incoming voice call blocking). After registration for telematics services has been completed, the mobile network operator may send a subsequence electronic message to the telematics unit to restore incoming voice call blocking by the telematics unit.

The mobile network operator then places a voice call to the unpublished phone number of the telematics unit. In an embodiment, the subscriber may email the mobile network operator to initiate the registration process. If the subscriber emails the mobile network operator, there is an about 2 minute delay that is provided between the contact that the subscriber sends to initiate the call and the time that the mobile network operator calls the unpublished number of the telematics unit. The mobile network operator then validates the subscriber, wherein validation is implied by a powered-on state of the telematics unit. The mobile network operator directs the call to the telematics unit where the telematics unit rings. In response to the telematics unit ringing, the voice call is answered by someone in the vehicle. The telematics unit will not ring unless the vehicle is in a powered-on state (e.g., with a key present and the vehicle turned on). It is assumed by the mobile network operator that a person in the vehicle with the key present and the telematics unit in a powered-on state is authorized. In an embodiment, it is useful for the call blocking of the telematics unit to be turned back on after the completion of a call in order to promote safety for the owner of the vehicle so as to remove possible distractions while driving. For example, unexpected voice calls placed to the telematics unit may distract the driver while driving the vehicle, increasing the chances that the driver may be involved in an accident. The present disclosure teaches temporarily removing that call blocking when initializing or registering for telematics services and then restoring call blocking after registration for telematics services has been completed. It is thought that the temporary suspension of call blocking for the telematics unit, under these circumstances (the vehicle is probably stationary), and the restoration of call blocking after registration for telematics services is complete may have a negligible effect on safety.

The mobile network operator then engages in a voice dialog with the subscriber associated with the vehicle, where the subscriber registers the telematics unit of the vehicle for telematics services. The mobile network operator may ask the subscriber questions to facilitate the completion of a profile. Some of the profile information may comprise name, age, residence, marital status, or other profile information. After completing the voice dialog with the subscriber that registers for the telematics services, the mobile network operator sends an electronic message to reestablish voice call blocking of the telematics unit of the vehicle via the mobile communication network. In an embodiment, the telematics unit is activated when the subscriber registers for telematics services. Activation of the telematics unit may comprise network provisioning and updating a hardware configuration of the telematics unit.

In an embodiment, the subscriber may send an email to the mobile network operator to initiate registration. In the email, the subscriber may provide the VIN of the vehicle so that the mobile network operator may look up the unpublished phone number of the telematics unit that is associated with the vehicle. In an embodiment, the subscriber may be able to call the mobile network operator directly from the vehicle via the telematics unit.

With the provided registration methods, telecommunications service providers may be able to register more subscribers to telematics services. The provided registration methods simplify the process of registration and activation for subscribers so that they may register for telematics services.

Figure 1:
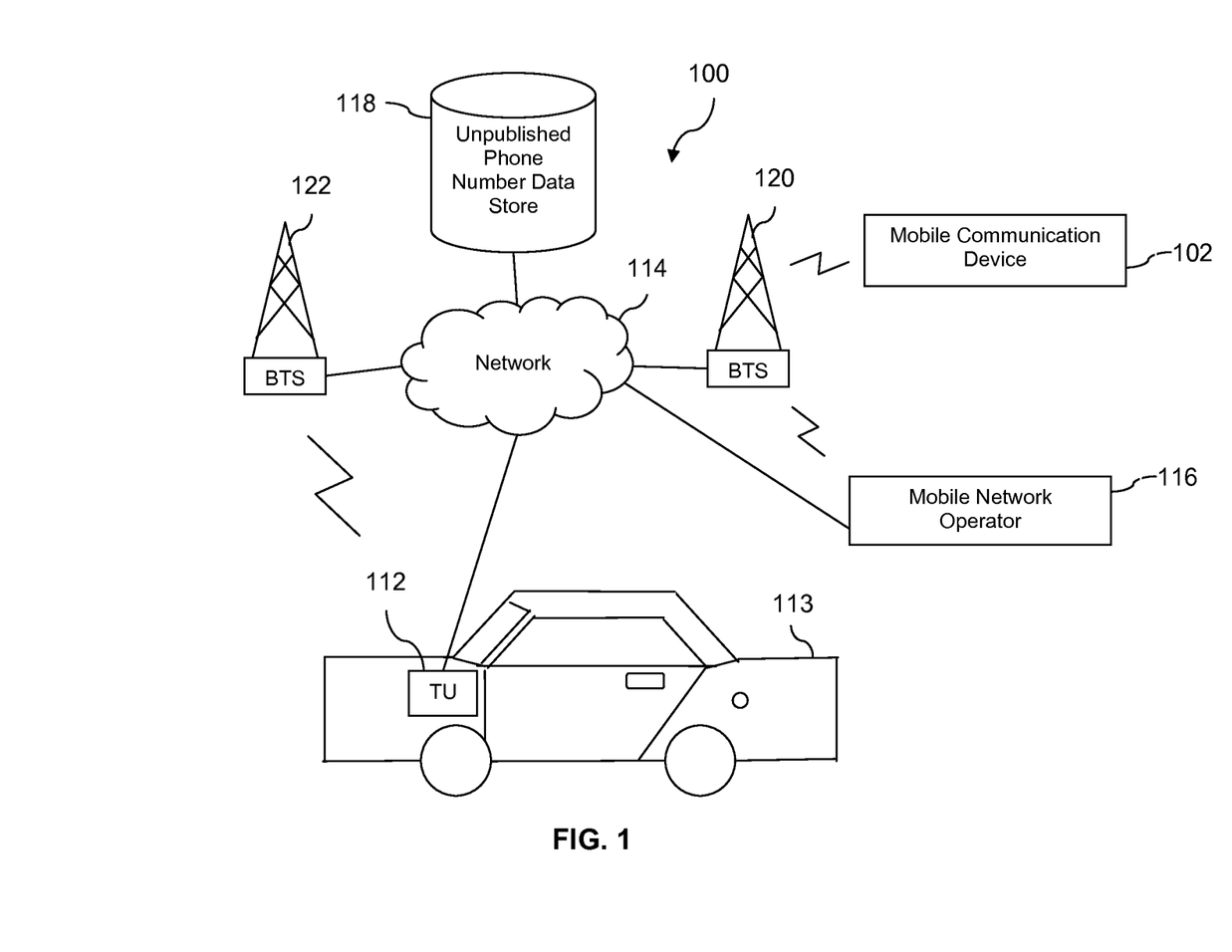
- FIG. 1 is a block diagram of a system according to an embodiment of the disclosure.

Turning now to FIG. 1, a communication system 100 is described. In an embodiment, the system 100 comprises a mobile communication device 102, a vehicle 113, a telematics unit 112 within the vehicle 113, and a mobile communication network 114. In an embodiment, the network 114 is a private network, a public network, or a combination thereof. The system 100 further comprises a mobile network operator 116, an unpublished phone number data store 118, and two base transceiver stations (BTS) 120 and 122.

In an embodiment, the mobile communication device 102 is associated with a subscriber that is associated with the vehicle 113. The subscriber may use the mobile communication device 102 to register the telematics unit 112 of the vehicle 113 for and to activate telematics services by contacting the mobile network operator 116. The mobile network operator 116 may be a call center employee that operates via the network 114. The subscriber gives the vehicle identification number (VIN) of the vehicle 113 to the mobile network operator 116 who accesses the unpublished phone number data store 118 to locate the unpublished phone number of the telematics unit 112. For example, the mobile network operator 116 uses a work station or computer to command a database management tool to look up the unpublished phone number of the telematics unit 112 using the VIN as a key. In an embodiment, the unpublished phone number is associated with the VIN of the vehicle 113. In an embodiment, the mobile network operator 116 and the unpublished phone number data store 118 are associated with a telecommunication service provider. In an embodiment, the telematics unit 112 receives sensor data from a plurality of vehicle systems. The vehicle systems that send sensor data to the telematics unit 112 may comprise one or more of an oxygen sensor, an air pressure sensor, an air temperature sensor, an engine temperature sensor, a throttle position sensor, a knock sensor, and other sensors.

After locating the unpublished phone number in the phone number data store 118, the mobile network operator 116 sends an electronic message to remove incoming voice call blocking of the phone number of the telematics unit 112 via the network 114. In an embodiment, voice call blocking prevents incoming voice calls from being completed to the telematics unit 112. The call blocking functionality may be located either in the network 114 or in the telematics unit 112 itself. The suspension of the voice call blocking functionality is done over a data channel between the network 114 and the telematics unit 112; the data channel is not blocked. The mobile network operator 116 places a voice call to the unpublished phone number of the telematics unit 112. Once the subscriber has answered, the mobile network operator 116 validates the subscriber, wherein validation is implied by a powered-on state of the telematics unit 112. With the subscriber validated, the mobile network operator 116 engages in a voice dialog with the subscriber associated with the vehicle 113. During the dialog, the subscriber registers the telematics unit 112 for telematics services. In an embodiment, the telematics services that the subscriber may register for may comprise one or more of remote door unlock, global positioning system (GPS) services, and other telematics services.

After the voice dialog is completed with the subscriber, the mobile network operator 116 sends an electronic message to reestablish voice call blocking of the telematics unit 112 of the vehicle 113 via the network 114. In an embodiment, the base transceiver stations 120 and/or 122 may provide a wireless communication link to the mobile communication device 102 to the network 114. In an embodiment, the base transceiver stations 120, 122 may provide a wireless communication link to the communication device 102 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol. While one mobile communication device 102 and two base transceiver stations 120, 122 are illustrated in FIG. 1, it is understood that the system 100 may comprise any number of base transceiver stations 120, 122 or mobile communication devices 102. In an embodiment, the telematics services are provided at least in part using a wireless communication link between the telematics unit 112 and the network 114 according to the aforementioned wireless protocols. The base transceiver stations 120, 122 may also provide a wireless link to the telematics unit 112.

In an embodiment, a subscriber's mobile communication device 102 contacts a mobile network operator 116 to register the telematics unit 112 of the vehicle 113 for telematics services. In an embodiment, the telematics services, for which the telematics unit 112 is registering for, may comprise one or more of remote door unlock, global positioning system (GPS) services, remote diagnosis, wherein remote diagnosis allows a user to check what aspects of a vehicle have been previously worked on or other telematics services. The telematics unit 112 may be activated when the subscriber registers for the telematics services, wherein activation of the telematics unit 112 comprises network provisioning and updating hardware configuration of the telematics unit 112.

In an embodiment the mobile network operator 116 and the telematics services are associated with a telecommunications service provider. The subscriber then provides a vehicle identification number (VIN) of the vehicle 113 that the telematics unit 112 is associated with via the mobile communication device 102. After receiving the VIN from the subscriber, the mobile network operator 116 looks up an unpublished phone number of the telematics unit based on the VIN of the vehicle 113. In an embodiment, the unpublished phone number of the telematics unit 112 is located in the unpublished phone number data store 118. The unpublished phone number is associated with the VIN of the vehicle 113.

The mobile network operator 116 then sends an electronic message to remove incoming voice call blocking of the phone number of the telematics unit 112 via the network 114. Voice call blocking prevents incoming voice calls from being completed to the telematics unit 112. In an embodiment, the voice call blocking functionality is located in the network 114, the telematics unit 112, or another location that may control voice call blocking functionality of the telematics unit 112. The mobile network operator 116 then places a voice call to the unpublished phone number of the telematics unit 112. In an embodiment, the subscriber may email the mobile network operator 116 to initiate the registration process and may include the VIN of the vehicle 113 in the email. If the subscriber emails the mobile network operator 116, the system 100 may provide a delay of about 2 minutes between the time the email is received by the mobile network operator 116 and the time that the voice call is placed to the telematics unit 112, thereby giving the user or subscriber time to find the key to the car, walk to the car, unlock the car, enter the car, and turn the engine on or engage the accessories switch. If the subscriber does not respond to the call to the telematics unit 112, the mobile network operator 116 may call in an additional 2 minutes.

The mobile network operator 116 validates the subscriber associated with the vehicle 113, wherein validation is implied with a powered-on state of the telematics unit 112. The mobile network operator 116 engages in a voice dialog with the subscriber associated with the vehicle 113. While the vehicle 113 may be associated with a particular subscriber, it is possible for people close to the subscriber to register for the telematics services, e.g., a father or mother registering for a child that received a new vehicle such as the vehicle 113. During the voice dialog, the subscriber registers the telematics unit 112 for telematics services. After completing the voice dialog with the subscriber, the mobile network operator 116 sends an electronic message to reestablish voice call blocking of the telematics unit 112 of the vehicle 113 via the network 114.

Figure 2:
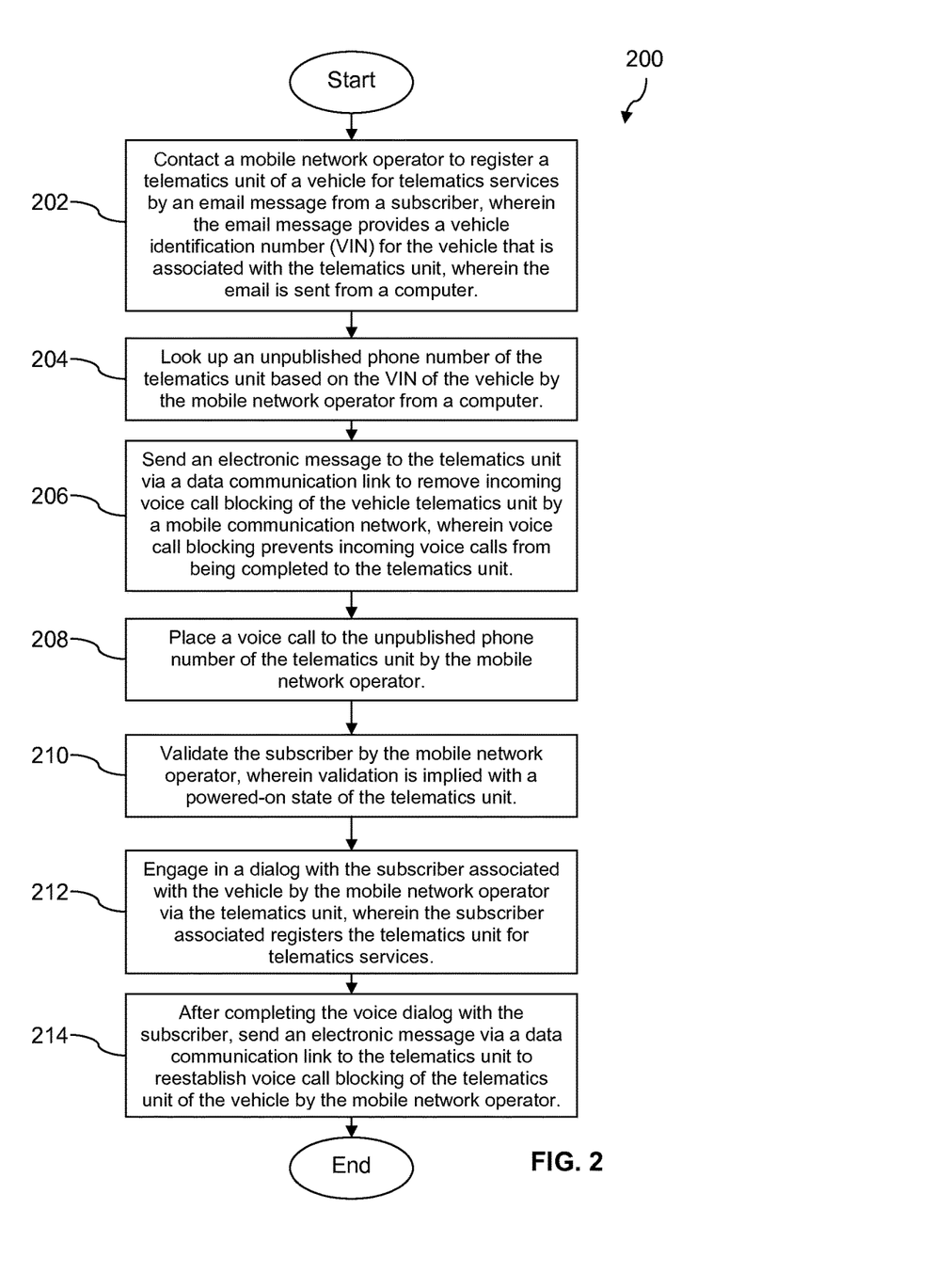
FIG. 2 is a flow chart of a method according to an embodiment of the disclosure.

In FIG. 2, a method 200 is described. At block 202, a subscriber contacts a mobile network operator to register a telematics unit of a vehicle for telematics services by an email message, wherein the email message provides a vehicle identification number (VIN) for the vehicle that is associated with the telematics unit, wherein the email message is sent from a computer. At block 204, the mobile network operator looks up an unpublished phone number of the telematics unit based on the VIN of the vehicle. At block 206, a mobile communication network sends an electronic message to remove incoming voice call blocking of the vehicle telematics unit, wherein voice call blocking prevents incoming voice calls from being completed to the telematics unit. At block 208, the mobile network operator places a voice call to the unpublished phone number of the telematics unit. At block 210, the mobile network operator validates the subscriber, wherein validation is implied with a powered-on state of the telematics unit. Validation does not occur if the telematics unit is not in a powered-on state and therefore if the key is not present, because the phone call cannot be received and answered when the vehicle is turned off. At block 212, the mobile network operator engages in a dialog with the subscriber associated with the vehicle via the telematics unit, wherein the subscriber registers the telematics unit for telematics services. Registration may include the mobile network operator asking the subscriber for profile information that may comprise name, age, gender, marital status, occupation, interests, and other information. At block 214, after completing the voice dialog with the subscriber, the mobile network operator sends an electronic message to reestablish voice call blocking of the telematics unit of the vehicle.

Figure 3:
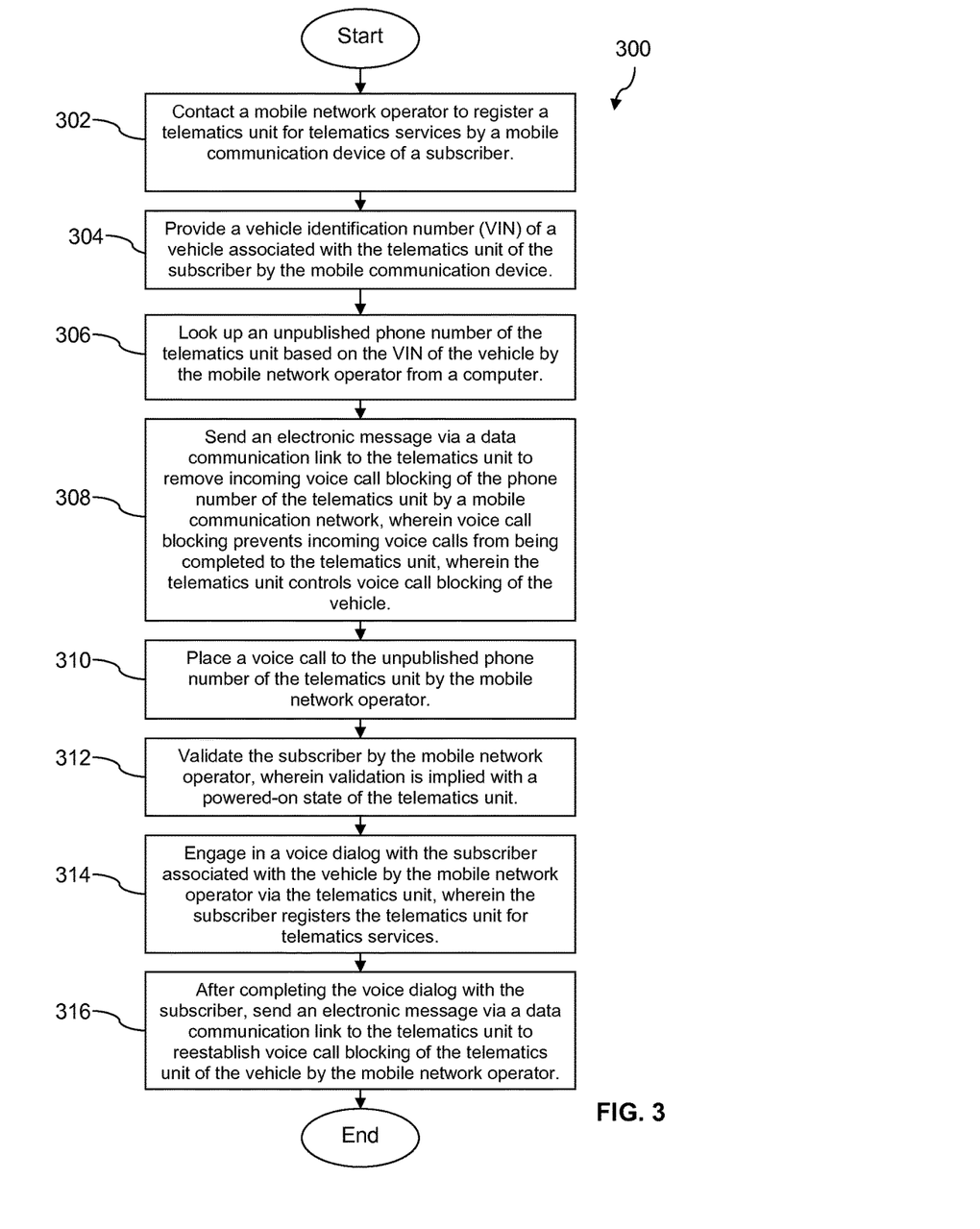
FIG. 3 is a flow chart of another method according to an embodiment of the disclosure.

In FIG. 3, a method 300 is described. At block 302, a mobile communication device of a subscriber contacts a mobile network operator to register a telematics unit for telematics services. At block 304, the mobile communication device provides a vehicle identification number (VIN) of a vehicle associated with the telematics unit of the subscriber. At block 306, the mobile network operator looks up an unpublished phone number of the telematics unit based on the VIN of the vehicle. At block 308, a mobile communication network sends an electronic message to the telematics unit on a data communication channel link to remove incoming voice call blocking of the phone number of the telematics unit, wherein voice call blocking prevents incoming voice calls from being completed to the telematics unit, wherein the telematics unit controls voice call blocking of the vehicle. At block 310, the mobile network operator places a voice call to the unpublished phone number of the telematics unit. At block 312, the mobile network operator validates the subscriber, wherein validation is implied with a powered-on state of the telematics unit. At block 314, the mobile network operator engages in a dialog with the subscriber associated with the vehicle via the telematics unit, wherein the subscriber registers the telematics unit for telematics services. At block 316, after completing the voice dialog with the subscriber, the mobile network operator sends an electronic message via a data communication link to the telematics unit to reestablish voice call blocking of the telematics unit of the vehicle.

Figure 4:
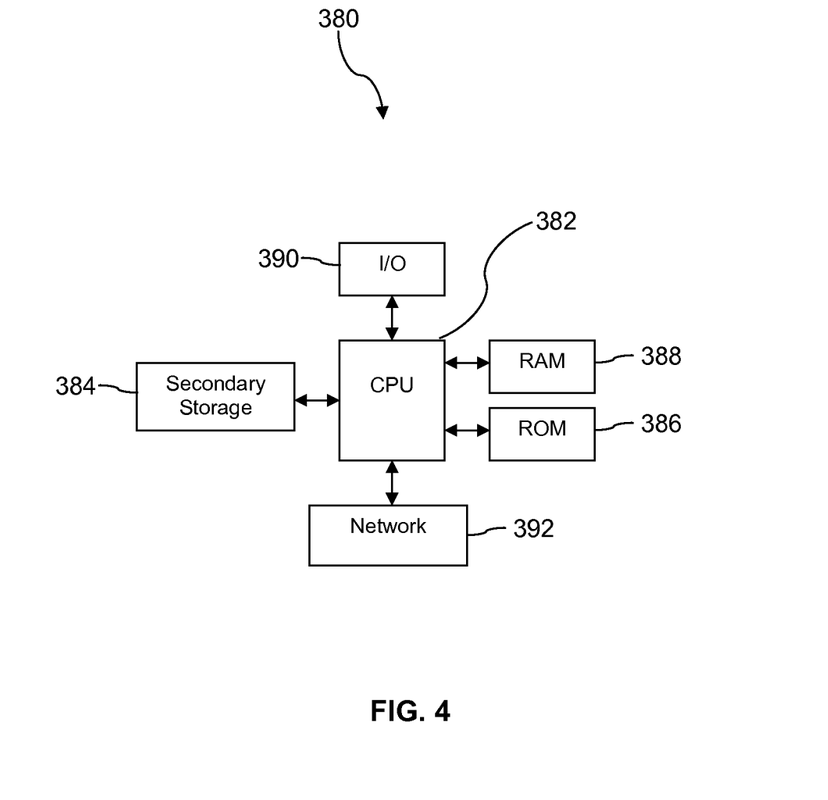
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other nonvolatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of registering a vehicle telematics unit for telematics services, comprising:
   contacting, by a mobile communication device of a subscriber, a mobile network operator to request to register a telematics unit of a vehicle for telematics services;
   in response to the request to register the telematics unit for telematics services:
      providing, by the mobile communication device, a vehicle identification number (VIN) of the vehicle that the telematics unit is associated with;
      identifying an unpublished phone number of the telematics unit based on the VIN of the vehicle by a computer of the mobile network operator;
      in response to identification of the unpublished phone number based on the VIN, sending an electronic message via a data communication link to the telematics unit to remove incoming voice call blocking of the unpublished phone number of the telematics unit by a computer of a mobile communication network, wherein voice call blocking prevents incoming voice calls from being completed to the telematics unit;
      in response to removal of voice call blocking, placing a voice call to the unpublished phone number of the telematics unit by the mobile network operator;
      validating the subscriber by the mobile network operator, wherein validation is implied by a powered-on state of the telematics unit;
      engaging in a dialog with the subscriber associated with the vehicle by the mobile network operator, wherein registration of the telematics unit for telematics services is completed based on the dialog with the subscriber; and
   after completing registration for the telematics services, sending an electronic message via a data communication link to the telematics unit to reestablish voice call blocking of the telematics unit of the vehicle by the mobile communication network.

2. The method of claim 1, wherein the telematics services, for which the telematics unit is registering, comprises one or more of remote door unlock and global positioning system (GPS) services.

3. The method of claim 1, wherein the mobile network operator is associated with a telecommunications service provider.

4. The method of claim 3, wherein the mobile network operator is associated with the mobile communication network that is associated with the telecommunications service provider.

5. The method of claim 4, wherein the call blocking functionality is provided by a network that is accessed by the mobile network operator.

6. The method of claim 1, wherein the telematics unit is activated when the subscriber registers for the telematics services.

7. The method of claim 6, wherein activation of the telematics unit comprises network provisioning and updating hardware configuration of the telematics unit.

8. A method of registering a vehicle telematics unit for telematics services, comprising:
   contacting a mobile network operator with a request to register a telematics unit of a vehicle for telematics services by an email message from a subscriber, wherein the email message provides a vehicle identification number (VIN) for the vehicle that is associated with the telematics unit, wherein the email is sent from a computer;

in response to the request to register the telematics unit for telematics services:

identifying an unpublished phone number of the telematics unit based on the VIN of the vehicle by a computer of the mobile network operator;

in response to identification of the unpublished phone number based on the VIN, sending an electronic message to the telematics unit via a data communication link to remove incoming voice call blocking of the vehicle telematics unit by a mobile communication network, wherein voice call blocking prevents incoming voice calls from being completed to the telematics unit;

in response to removal of voice call blocking, placing a voice call to the unpublished phone number of the telematics unit by the mobile network operator;

validating the subscriber by the mobile network operator, wherein validation is implied by a powered-on state of the telematics unit;

engaging in a dialog with the subscriber associated with the vehicle by the mobile network operator, wherein registration of the telematics unit for telematics services is completed based on the dialog; and after completing registration for the telematics services, sending an electronic message via a data communication link to the telematics unit to reestablish voice call blocking of the telematics unit of the vehicle by the mobile network operator.

9. The method of claim 8, wherein the unpublished phone number is located in a phone number data store.

10. The method of claim 9, wherein the unpublished phone number is associated with the VIN of the vehicle.

11. The method of claim 8, wherein the phone number data store is associated with a telecommunications service provider.

12. The method of claim 8, wherein the telematics services are provided at least in part using a wireless communication link between the telematics and the mobile communication network according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known protocol.

13. The method of claim 8, wherein a delay of about 2 minutes is provided between the email that the subscriber sends and the mobile network operator's call to the unpublished phone number of the telematics unit.

14. The method of claim 13, wherein if the subscriber does not respond to the call, the mobile network operator calls back in no longer than an additional 2 minutes.

15. A method of registering a vehicle telematics unit for telematics services, comprising:

contacting a mobile network operator with a request to register a telematics unit for telematics services by a mobile communication device of a subscriber;

in response to the request to register the telematics unit for telematics services:

providing, by the mobile communication device, a vehicle identification number (VIN) of a vehicle associated with the telematics of the subscriber;

identifying an unpublished phone number of the telematics unit based on the VIN of the vehicle by a computer of the mobile network operator;

in response to identification of the unpublished phone number based on the VIN, sending an electronic message via a data communication link to the telematics unit to remove incoming voice call blocking of the unpublished phone number of the telematics unit by a mobile communication network, wherein voice call blocking prevents incoming voice calls from being completed to the telematics unit, and wherein the telematics unit controls voice call blocking of the vehicle;

in response to removal of voice call blocking, placing a voice call to the unpublished phone number of the telematics unit by the mobile network operator;

validating the subscriber by the mobile network operator, wherein validation is implied with a powered on state of the telematics unit;

engaging in a voice dialog with the subscriber associated with the vehicle by the mobile network operator, wherein registration of the telematics unit for telematics services is completed based on the dialog; and after completing registration for the telematics services, sending, by the mobile network operator, an electronic message via a data communication link to the vehicle telematics unit to reestablish voice call blocking of the telematics unit.

16. The method of claim 15, wherein the subscriber can contact the mobile network operator from the vehicle using the vehicle telematics unit.

17. The method of claim 15, wherein during the voice call, the mobile network operator registers the subscriber that is associated with the vehicle for communication services that may comprise one or more of remote door unlock services and global positioning system (GPS) services.

18. The method of claim 15, wherein the telematics unit receives sensor data from a plurality of vehicle systems.

19. The method of claim 18, wherein the vehicle systems that send sensor data to the telematics unit comprise one or more of an oxygen sensor, an air pressure sensor, an air temperature sensor, an engine temperature sensor, a throttle position sensor, a knock sensor, and other sensors.

20. The method of claim 15, wherein the telematics services, for which the telematics unit is registering, comprises one or more of remote door unlock and global positioning system (GPS) services.

* * * * *